US008547832B2

(12) United States Patent
Gupta et al.

(10) Patent No.: US 8,547,832 B2
(45) Date of Patent: Oct. 1, 2013

(54) DISTRIBUTING ETHERNET ALARM INDICATION SIGNAL INFORMATION TO MULTIPLE VIRTUAL LOCAL AREA NETWORKS

(75) Inventors: Nitin Gupta, Bangalore (IN); Sonal Shah, Bangalore (IN); Aravindan Ramalingam, Bangalore (IN); Norman William Finn, Livermore, CA (US)

(73) Assignee: Cisco Technology, Inc., San Jose, CA (US)

( * ) Notice: Subject to any disclaimer, the term of this patent is extended or adjusted under 35 U.S.C. 154(b) by 506 days.

(21) Appl. No.: 12/728,460

(22) Filed: Mar. 22, 2010

(65) Prior Publication Data

US 2011/0194564 A1 Aug. 11, 2011

(30) Foreign Application Priority Data

Feb. 5, 2010 (IN) .............................. 254/DEL/2010

(51) Int. Cl.
*G01R 31/08* (2006.01)
(52) U.S. Cl.
USPC ........... 370/229; 370/389; 370/390; 370/392; 370/393
(58) Field of Classification Search
None
See application file for complete search history.

(56) References Cited

U.S. PATENT DOCUMENTS

| 6,614,787 | B1 * | 9/2003 | Jain et al. | 370/390 |
|---|---|---|---|---|
| 6,912,592 | B2 * | 6/2005 | Yip | 709/249 |
| 7,227,838 | B1 * | 6/2007 | O'Riordan | 370/219 |
| 7,693,048 | B1 * | 4/2010 | O'Riordan | 370/219 |
| 7,733,794 | B2 * | 6/2010 | Damm | 370/252 |
| 7,768,918 | B2 * | 8/2010 | Chao et al. | 370/231 |
| 7,808,914 | B2 * | 10/2010 | Li | 370/241.1 |
| 7,855,968 | B2 * | 12/2010 | Elie-Dit-Cosaque et al. | 370/241.1 |
| 7,877,483 | B1 * | 1/2011 | Finn | 709/227 |
| 8,054,751 | B2 * | 11/2011 | Elie-Dit-Cosaque et al. | 370/241.1 |
| 2001/0005369 | A1 * | 6/2001 | Kloth | 370/392 |
| 2003/0185223 | A1 * | 10/2003 | Tate et al. | 370/410 |
| 2004/0160895 | A1 * | 8/2004 | Holmgren et al. | 370/223 |
| 2005/0249119 | A1 * | 11/2005 | Elie-Dit-Cosaque et al. | 370/236 |
| 2005/0249124 | A1 * | 11/2005 | Elie-Dit-Cosaque et al. | 370/242 |
| 2006/0031482 | A1 * | 2/2006 | Mohan et al. | 709/224 |

(Continued)

OTHER PUBLICATIONS

"OAM functions and mechanisms for Ethernet based networks," ITU-T Standard, International Telecommunication Union, Geneva , CH, No. Y.1731, Feb. 29, 2008 (78 pages).

(Continued)

*Primary Examiner* — Ayaz Sheikh
*Assistant Examiner* — Faiyazkhan Ghafoerkhan
(74) *Attorney, Agent, or Firm* — The Law Office of Kirk D. Williams

(57) ABSTRACT

Ethernet Alarm Indication Signal (ETH-AIS) information for multiple Virtual Local Area Networks (VLANs) is consolidated and distributed to the multiple VLANs in a single Ethernet frame. Note, as used herein, "Alarm Indication Signal (ETH-AIS)" refers to an IEEE 802.x or ITU-T Y.1731 Ethernet Alarm Indication Signal. A device receiving the Ethernet frame with the consolidated ETH-AIS information typically forwards the frame out each port that communicates traffic for one of the VLANs included in the consolidated ETH-AIS information.

20 Claims, 5 Drawing Sheets

(56) References Cited

U.S. PATENT DOCUMENTS

| | | | |
|---|---|---|---|
| 2006/0055529 A1* | 3/2006 | Ratiu et al. | 340/539.1 |
| 2006/0056331 A1* | 3/2006 | Ratiu et al. | 370/316 |
| 2006/0056363 A1* | 3/2006 | Ratiu et al. | 370/338 |
| 2006/0056368 A1* | 3/2006 | Ratiu et al. | 370/338 |
| 2006/0056423 A1* | 3/2006 | Ratiu et al. | 370/401 |
| 2006/0056456 A1* | 3/2006 | Ratiu et al. | 370/474 |
| 2006/0285501 A1* | 12/2006 | Damm | 370/252 |
| 2007/0078969 A1* | 4/2007 | Ngo et al. | 709/224 |
| 2007/0110078 A1* | 5/2007 | De Silva et al. | 370/395.53 |
| 2007/0288615 A1* | 12/2007 | Keohane et al. | 709/223 |
| 2008/0170344 A1* | 7/2008 | Byron | 361/63 |
| 2008/0172497 A1* | 7/2008 | Mohan et al. | 709/249 |
| 2009/0135750 A1* | 5/2009 | Ratiu et al. | 370/310 |
| 2009/0168783 A1* | 7/2009 | Mohan et al. | 370/395.5 |
| 2011/0187488 A1* | 8/2011 | Fiske et al. | 340/3.1 |

OTHER PUBLICATIONS

"Virtual Bridged Local Area Networks, Amendment 5: Connectivity Fault Management," IEEE Standard for Local and metropolitan area networks, IEEE Computer Society, IEEE Std 802.1ag™—2007, Dec. 17, 2007, Introductory pages, pp. 1-124 (138 pages).

"Virtual Bridged Local Area Networks, Amendment 5: Connectivity Fault Management," IEEE Standard for Local and metropolitan area networks, IEEE Computer Society, IEEE Std 802.1ag™—2007, Dec. 17, 2007, pp. 125-246.

PCT International Preliminary Report on Patentability for PCT Application PCT/US2011/023083 (which claims priority to U.S. Appl. No. 12/728,460), ISA/EPO, mailed Aug. 16, 2012 (nine pages).

\* cited by examiner

DISTRIBUTING ETHERNET ALARM INDICATION SIGNAL INFORMATION TO MULTIPLE VIRTUAL LOCAL AREA NETWORKS

TECHNICAL FIELD

The present disclosure relates generally to distributing Ethernet Alarm Indication Signal (ETH-AIS) information to multiple Virtual Local Area Networks (VLANs).

BACKGROUND

The communications industry is rapidly changing to adjust to emerging technologies and ever increasing customer demand. This customer demand for new applications and increased performance of existing applications is driving communications network and system providers to employ networks and systems having greater speed and capacity. In trying to achieve these goals, a common approach taken by many communications providers is to use packet switching technology.

Ethernet as a metropolitan and wide-area networking technology imposes a new set of operations, administration and maintenance (OAM) requirements. ITU-T Y.1731 defines new Ethernet Alarm Indication Signal (ETH-AIS) functionality for fault and performance management in order to provide for these needs of service provider in large network. AIS primarily satisfies two purposes: alarm suppression so that a network management system does not receive an excessive number of redundant alarms for a particular fault; and provides faster notification to the higher-level customer domains that a transport path has failed. Thus, in response to link failure, a prior AIS module transmits corresponding ETH-AIS information individually to each of the active VLANs on the affected port (e.g., IEEE 802.1Q trunk link) in the opposite direction of the fault. In other words, a prior AIS module sends each affected VLAN a separate Ethernet frame, which is IEEE 802.1q tagged (e.g., addressed) to a single particular VLAN, with the Ethernet frame including a protocol data unit with ETH-AIS information for that single particular VLAN.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DESCRIPTION OF EXAMPLE EMBODIMENTS

1. Overview

Figure 1:
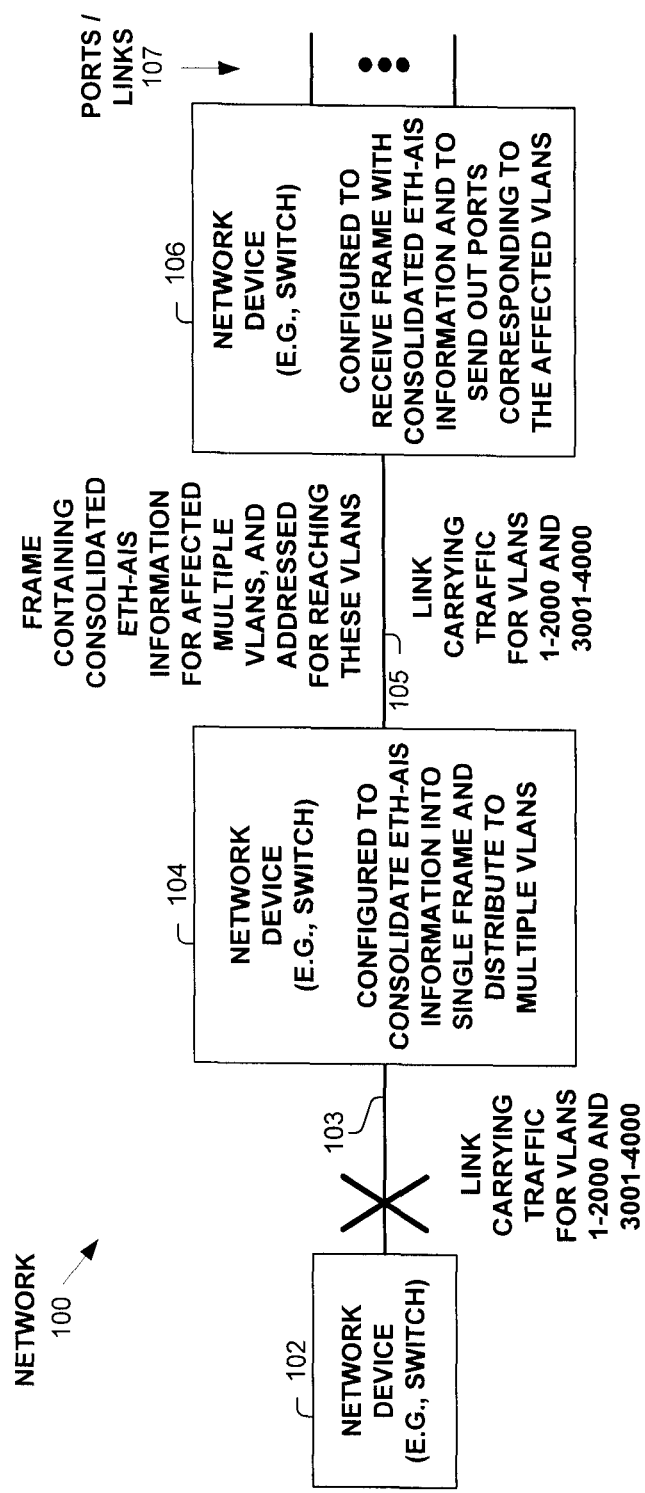
FIG. 1 illustrates a network operating according to one embodiment.

Disclosed are, inter alia, methods, apparatus, computer-storage media, mechanisms, and means associated with distributing Ethernet Alarm Indication Signal (ETH-AIS) Information to multiple Virtual Local Area Networks (VLANs). Note, as used herein, "Alarm Indication Signal (ETH-AIS)" refers to an IEEE 802.x or ITU-T Y.1731 Ethernet Alarm Indication Signal.

One embodiment is performed by one or more network devices. One such method includes: a first network device consolidating Ethernet Alarm Indication Signal (ETH-AIS) information corresponding to a plurality of Virtual Local Area Networks (VLANs) into a single Ethernet frame; sending, by the first network device, the Ethernet frame to a second network device over a communications link carrying traffic for the plurality of VLANs; receiving the Ethernet frame by a second network device on a particular port of a plurality of ports of the second network device; and sending, by the second network device, ETH-AIS information of said received consolidated ETH-AIS information corresponding to each particular VLAN of the plurality of VLANs out each port of the plurality of ports configured for sending packets for the particular VLAN except for the particular port on which said consolidated ETH-AIS information was received.

In one embodiment, a particular plurality of ports includes all ports of the plurality of ports, except for the particular port, configured for sending and receiving packets of at least one of the plurality of VLANs, and wherein said operation of sending includes: sending said consolidated ETH-AIS information in a single Ethernet frame out each port of the plurality of particular ports. In one embodiment, said sending said consolidated ETH-AIS information in a single Ethernet frame out each port of the plurality of particular ports includes forwarding said Ethernet frame received by the second network device out each port of the plurality of particular ports. In one embodiment, the Ethernet frame said received by the second network device is tagged with a particular tag identifying a VLAN different than one of the plurality of VLANs; and wherein the method includes: identifying, by the second network device, the particular plurality of ports based on the particular tag. One embodiment includes: programming the second network device with a supervisor VLAN corresponding to the particular VLAN, with the supervisor VLAN including the particular plurality of ports. In one embodiment, the particular tag is an IEEE 802.1q tag. In one embodiment, said Ethernet frame sent by the first network device includes the ETH-AIS information in an ITU-T Y.1731 Packet Data Unit (PDU) or according to IEEE 802.1ag.

2. Description

Disclosed are, inter alia, methods, apparatus, computer-storage media, mechanisms, and means associated with distributing Ethernet Alarm Indication Signal (ETH-AIS) Information to multiple Virtual Local Area Networks (VLANs). Note, as used herein, "Alarm Indication Signal (ETH-AIS)" refers to an IEEE 802.x or ITU-T Y.1731 Ethernet Alarm Indication Signal. Embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable media containing instructions. One or multiple systems, devices, components, etc. may comprise one or more embodiments, which may include some elements or limitations of a claim being performed by the same or different systems, devices, components, etc. A processing element may be a general processor, task-specific processor, or other implementation for performing the corresponding processing. The embodiments described hereinafter embody various aspects and configurations within the scope and spirit of the invention, with the figures illustrating exemplary and non-limiting configurations. Note, computer-readable media and means for performing methods and processing block operations (e.g., a processor and memory or other apparatus configured to perform such operations) are disclosed and are in keeping with the extensible scope and spirit of the invention. Note, the term "apparatus" is used consistently herein with its common definition of an appliance or device.

Note, the steps, connections, and processing of signals and information illustrated in the figures, including, but not limited to any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also note, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC §101 machine statutory class.

Disclosed are, inter alia, methods, apparatus, computer-storage media, mechanisms, and means associated with distributing Ethernet Alarm Indication Signal (ETH-AIS) Information to multiple Virtual Local Area Networks (VLANs). Note, as used herein, "Alarm Indication Signal (ETH-AIS)" refers to an IEEE 802.x or ITU-T Y.1731 Ethernet Alarm Indication Signal.

One embodiment is performed by one or more network devices. One such method includes: a first network device consolidating Ethernet Alarm Indication Signal (ETH-AIS) information corresponding to a plurality of Virtual Local Area Networks (VLANs) into a single Ethernet frame; sending, by the first network device, the Ethernet frame to a second network device over a communications link carrying traffic for the plurality of VLANs; receiving the Ethernet frame by a second network device on a particular port of a plurality of ports of the second network device; and sending, by the second network device. ETH-AIS information of said received consolidated ETH-AIS information corresponding to each particular VLAN of the plurality of VLANs out each port of the plurality of ports configured for sending packets for the particular VLAN except for the particular port on which said consolidated ETH-AIS information was received.

In one embodiment, a particular plurality of ports includes all ports of the plurality of ports, except for the particular port, configured for sending and receiving packets of at least one of the plurality of VLANs, and wherein said operation of sending includes: sending said consolidated ETH-AIS information in a single Ethernet frame out each port of the plurality of particular ports. In one embodiment, said sending said consolidated ETH-AIS information in a single Ethernet frame out each port of the plurality of particular ports includes forwarding said Ethernet frame received by the second network device out each port of the plurality of particular ports. In one embodiment, the Ethernet frame said received by the second network device is tagged with a particular tag identifying a VLAN different than one of the plurality of VLANs; and wherein the method includes: identifying, by the second network device, the particular plurality of ports based on the particular tag. One embodiment includes: programming the second network device with a supervisor VLAN corresponding to the particular VLAN, with the supervisor VLAN including the particular plurality of ports. In one embodiment, the particular tag is an IEEE 802.1q tag. In one embodiment, said Ethernet frame sent by the first network device includes the ETH-AIS information in an ITU-T Y.1731 Packet Data Unit (PDU) or according to IEEE 802.1ag.

Note, a supervisor VLAN refers to a set of one or more VLANs, typically identified by a VLAN value not assigned to another VLAN. Thus, for example, if there are two VLANs 100 and 101, whose supervisor VLAN is 200: a packet tagged for VLAN 100 will be forwarded out ports of the network device corresponding to VLAN 100; a packet tagged for VLAN 101 will be forwarded out ports of the network device corresponding to VLAN 101; and a packet tagged for VLAN 200 will be forwarded out ports of the network device corresponding to both VLANs 100 and 101.

One embodiment includes an apparatus, comprising: a plurality of ports configured for communicating over a plurality of links; one or more processors and one or more memories; wherein said one or more processors are configured to perform operations, with said operations including: consolidating Ethernet Alarm Indication Signal (ETH-AIS) information corresponding to a plurality of Virtual Local Area Networks (VLANs) into a single Ethernet frame; and sending the Ethernet frame from one of the plurality of ports over a communications link carrying traffic for the plurality of VLANs thereby providing the corresponding ETH-AIS information to one or more devices in each of the plurality of VLANs.

In one embodiment, said Ethernet frame said sent by the apparatus is tagged with a particular tag identifying a VLAN different than one of the plurality of VLANs for use by a receiving network node for identifying a particular plurality of ports from which to forward said ETH-AIS information. In one embodiment, the particular tag is an IEEE 802.1q tag. In one embodiment, said Ethernet frame said sent by the apparatus includes the ETH-AIS information in an ITU-T Y.1731 Packet Data Unit (PDU) or according to IEEE 802.1ag.

One embodiment includes an apparatus, comprising: a plurality of ports configured for communicating over a plurality of links; one or more processors and one or more memories; wherein said one or more processors are configured to perform operations, with said operations including: receiving, on a particular port of the plurality of ports, an Ethernet frame including consolidated Ethernet Alarm Indication Signal (ETH-AIS) information corresponding to a plurality of Virtual Local Area Networks (VLANs); and sending ETH-AIS information of said received consolidated ETH-AIS information corresponding to each particular VLAN of the plurality of VLANs out each port of the plurality of ports configured for sending packets for the particular VLAN except for the particular port.

In one embodiment, the Ethernet frame is tagged with a particular 802.1q tag identifying a particular VLAN different than one of the plurality of VLANs; and wherein said operation of sending ETH-AIS information of said received consolidated ETH-AIS information corresponding to each particular VLAN of the plurality of VLANs out each port of the plurality of ports configured for sending packets for the particular VLAN except for the particular port includes: identifying the particular plurality of ports from which to forward said ETH-AIS information based on the particular 802.1q tag, and forwarding said Ethernet frame received by the second network device out each port of the plurality of particular ports. In one embodiment, the Ethernet frame includes the ETH-AIS information in an ITU-T Y.1731 Packet Data Unit (PDU) or according to IEEE 802.1ag.

Expressly turning to the figures, FIG. 1 illustrates a network 100 operating according to one embodiment. As shown, network 100 includes three network devices (102, 104, 106) (e.g., switches), which are configured to communicate ETH-AIS information. For illustrative purposes, it is assumed that traffic is carried for three thousand VLANs (1-2000, 3001-4000) over each of communications links 103 and 105. Thus, in response to a failure of link 103, network device 104 determines the affected VLANs, and prepares to transmit the ETH-AIS information for each of the VLANs to network device 106. Note, in a prior system, a network device would send, over the non-compromised link three thousand different tagged Ethernet frames, a different one for each of the affected three thousand VLANs, with each frame including a Y.1731 PDU containing the ETH-AIS information for the corresponding one VLAN. In contrast, network device 104 consolidates the ETH-AIS information for these three thousand VLANs into a single Ethernet frame, which is sent to network device 106 over communications link 105. Network device 106 receives the single Ethernet frame with the consolidated ETH-AIS information, and typically forwards it from the ports communicating traffic for one of the affected VLANs (with the exception of the port on which the frame was originally received).

In one embodiment, the Ethernet frame containing the consolidated ETH-AIS information is tagged with a VLAN value to identify a supervisor VLAN corresponding to each of the VLANs to be given the consolidated ETH-AIS information, or a special VLAN value which results in the identification of each of the VLANs to be given the consolidated ETH-AIS information. Thus, the ports from which to forward the received Ethernet frame can be readily identified (e.g., all ports carrying traffic for one of the VLANs corresponding to the consolidated ETH-AIS information, with the exception of the port on which the Ethernet frame was received). In one embodiment, the Ethernet frame containing the consolidated ETH-AIS information is not tagged, which results in the (default) identification of each of the VLANs to be given the consolidated ETH-AIS information. Note, the corresponding VLANs (or ports associated therewith) are typically predetermined and configured for rapid forwarding of the received consolidated ETH-AIS information. While in one embodiment, the receiving network device inspects the consolidated VLAN information to determine for which VLANs ETH-AIS information is included; and based thereon, determines from which ports to send the consolidated ETH-AIS information (or portions thereof).

Figure 2:
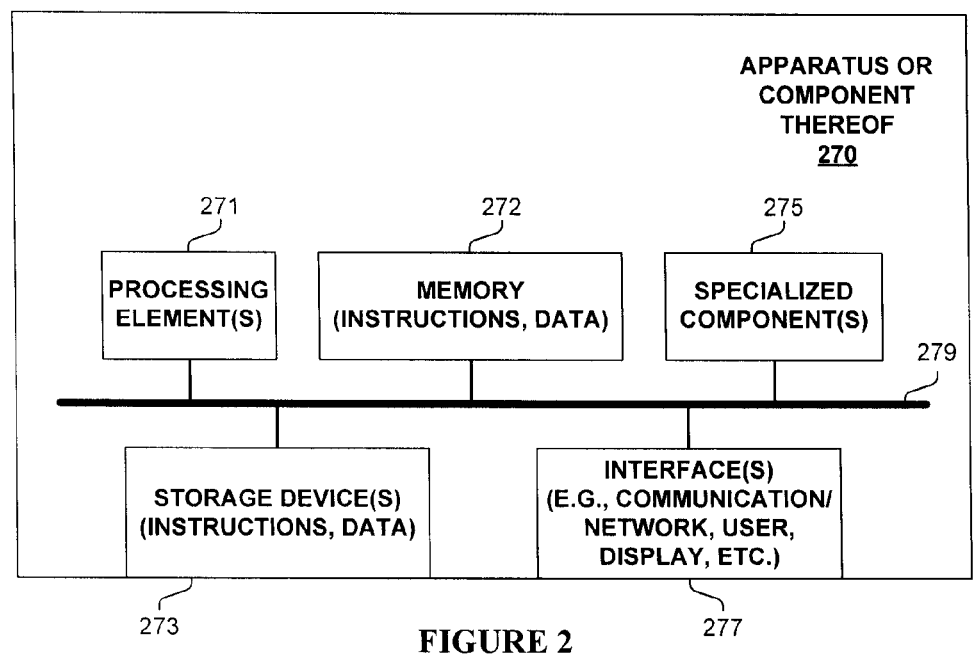
FIG. 2 illustrates an apparatus or component used in one embodiment.

FIG. 2 is a block diagram of an apparatus or component 270 thereof used in one embodiment associated with distributing ETH-AIS information to multiple VLANs. In one embodiment, apparatus or component 270 performs one or more processes corresponding to one of the flow diagrams illustrated herein or otherwise described herein.

In one embodiment, apparatus or component 270 includes one or more processing element(s) 271, memory 272, storage device(s) 273, specialized component(s) 275 (e.g. optimized hardware such as for performing operations, etc.), and interface(s) 277 for communicating information (e.g., sending and receiving packets, user-interfaces, displaying information, etc.), which are typically communicatively coupled via one or more communications mechanisms 279, with the communications paths typically tailored to meet the needs of the application. In one embodiment apparatus or component 270 corresponds to, or is part of, network device 104 or 106 of FIG. 1.

Various embodiments of apparatus or component 270 may include more or less elements. The operation of apparatus or component 270 is typically controlled by processing element(s) 271 using memory 272 and storage device(s) 273 to perform one or more tasks or processes. Memory 272 is one type of computer-storage medium, and typically comprises random access memory (RAM), read only memory (ROM), flash memory, integrated circuits, and/or other memory components. Memory 272 typically stores computer-executable instructions to be executed by processing element(s) 271 and/or data which is manipulated by processing element(s) 271 for implementing functionality in accordance with an embodiment. Storage device(s) 273 are another type of computer-storage medium, and typically comprise solid state storage media, disk drives, diskettes, networked services, tape drives, and other storage devices. Storage device(s) 273 typically store computer-executable instructions to be executed by processing element(s) 271 and/or data which is manipulated by processing element(s) 271 for implementing functionality in accordance with an embodiment.

Figure 3A:
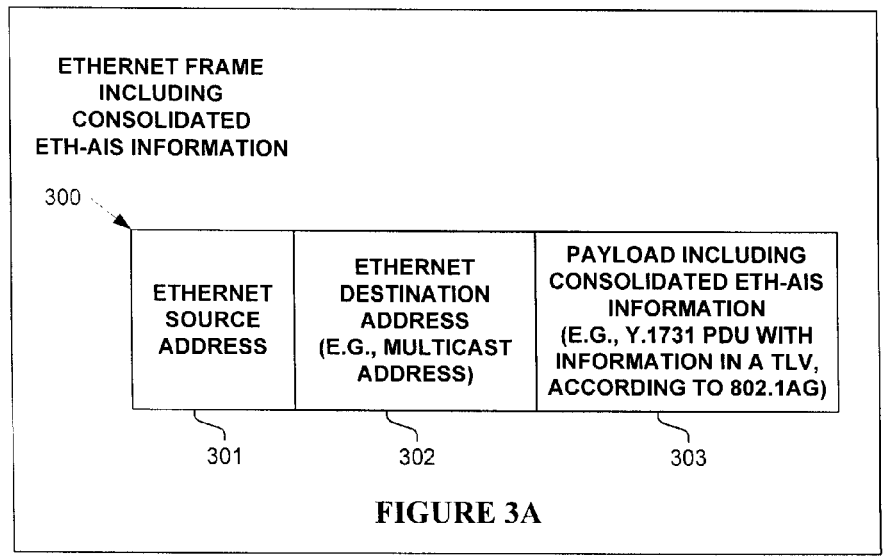
FIG. 3A illustrates a format of an Ethernet frame used in one embodiment to distribute ETH-AIS information concerning, and to, multiple VLANs.

FIG. 3A illustrates a format of an Ethernet frame 300 used in one embodiment to distribute ETH-AIS information concerning, and to, multiple VLANs. As shown, Ethernet frame 300 includes Ethernet source address 301, Ethernet destination address 302 (typically a multicast address corresponding to a particular VLAN), and a payload 303 including the consolidated ETH-AIS information. As Ethernet frame 300 is not tagged, by default, the receiving network device identifies each of the VLANs to be given the consolidated ETH-AIS information (typically predetermined and preconfigured).

Figure 3B:
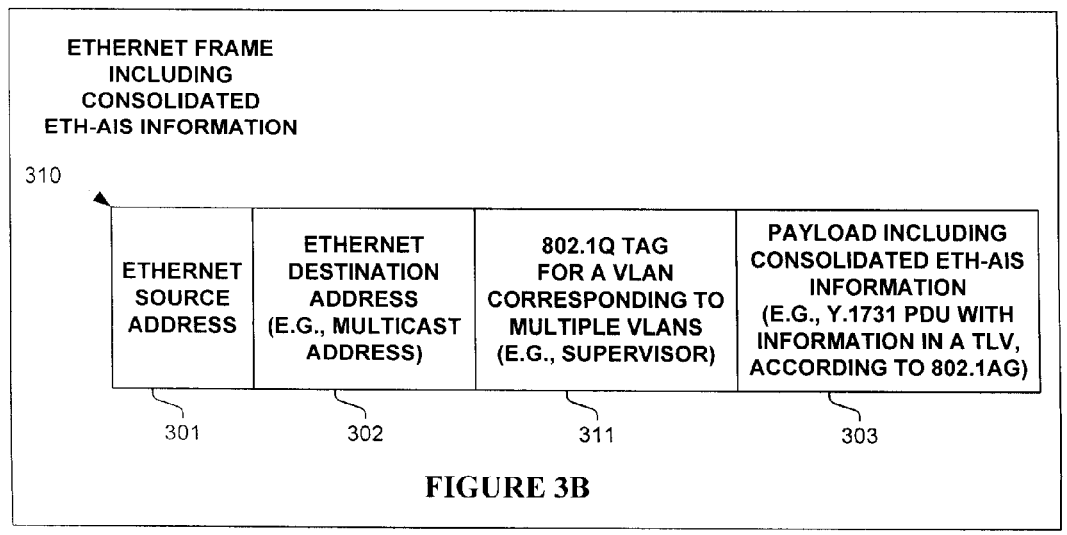
FIG. 3B illustrates a format of an Ethernet frame used in one embodiment to distribute ETH-AIS information concerning, and to, multiple VLANs.

Ethernet frame 310 of FIG. 3B is similar to that of Ethernet frame 300 (FIG. 3B), with the addition of a tag of the frame to specify a VLAN to which Ethernet frame 310 is directed. As Ethernet frame 310 is tagged (e.g., includes an 802.1q tag in one embodiment), the receiving node typically uses the VLAN identified by tag 311 to determine from which ports to forward the received consolidated ETH-AIS information (or portions thereof).

The payload 303 of Ethernet frames 300 and 310 including the consolidated ETH-AIS information can be formatted in an extensible number of ways. For example, in one embodiment, the consolidated ETH-AIS information is included in a Y.1731 PDU or according to 802.1ag. In one embodiment, the consolidated ETH-AIS information is encoded in a type-length-value (TLV), possibly within a Y.1731 PDU. The actual ETH-AIS information may be encoded in one of an extensible number of different formats, such as in an array, a data structure representing a sparse array (e.g., one or more sequences of a starting VLAN, the number of VLANs starting with the starting value, and the corresponding data for these VLANs), or other data format.

Figure 4:
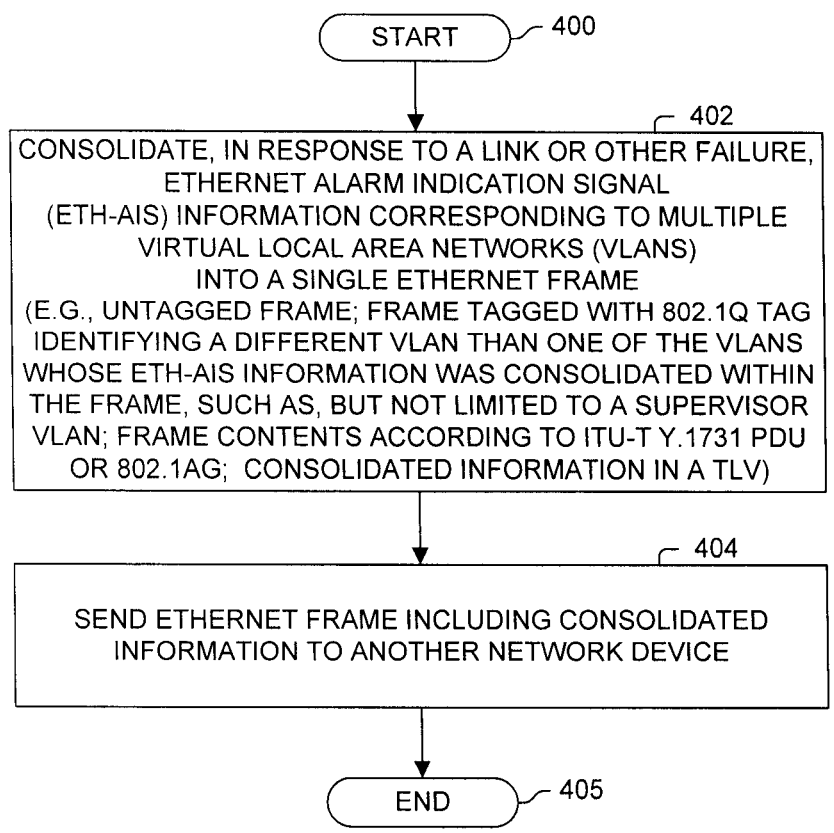
FIG. 4 illustrates a process performed in one embodiment.

FIG. 4 illustrates a process for consolidating the ETH-AIS information and forwarding to a second network device as performed in one embodiment. Processing begins with process block 400. In process block 402, the network device consolidates, such as in response to a link or other failure, ETH-AIS information corresponding to multiple VLANs into a single Ethernet frame (e.g., untagged frame; frame tagged with 802.1q tag identifying a different VLAN than one of the VLANs whose ETH-AIS information was consolidated within the frame, such as, but not limited to a supervisor VLAN; frame contents according to ITH-T Y.1731 PDU or 802.1ag; consolidated information in a TLV; etc.). In process block 404, the Ethernet frame including the consolidated ETH-AIS information is forwarded to one or more other network devices. Processing of the flow diagram of FIG. 4 is complete as indicated by process block 405.

Figure 5:
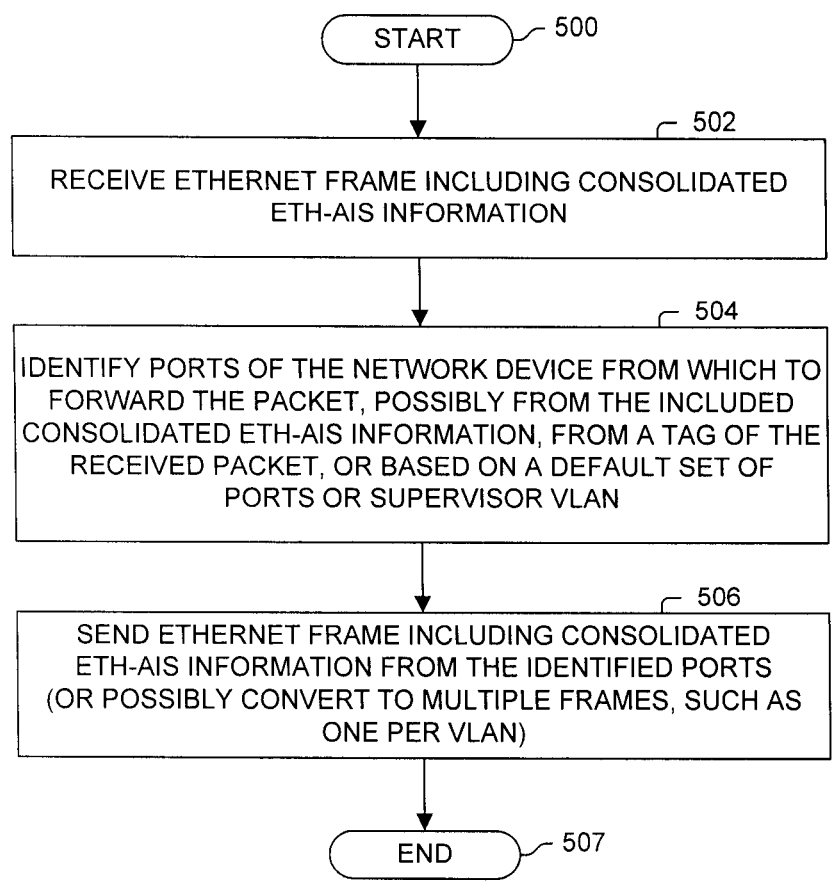
FIG. 5 illustrates a process performed in one embodiment.

FIG. 5 illustrates a process for communicating received consolidating the ETH-AIS information to one or more other network devices as performed in one embodiment. Processing begins with process block 500. In process block 502, the Ethernet frame including the consolidated ETH-AIS information is received. In process block 504, the receiving network device identifies ports of the network device from which to forward the packet, possibly from the included consolidated ETH-AIS information, from a tag of the received packet, or based on a default set of ports or an identified (or default) supervisor VLAN. Note, the set of identified ports typically does not include the port on which the Ethernet frame (including the consolidated ETH-AIS information) was received. In process block 506, the received Ethernet frame, including the consolidated ETH-AIS information, is typically forwarded out each of these identified ports. Note, in one embodiment, the consolidated AIS information may be partitioned into different subsets, and sent out corresponding ports. Also, in one embodiment especially configured to be backward compatible with older devices, the network device creates and sends out a tagged Ethernet frame for each of the VLANs referenced in the corresponding ETH-AIS information, with each of these tagged Ethernet frames including ETH-AIS information for the single, corresponding VLAN. Processing of the flow diagram of FIG. 5 is complete as indicated by process block 507.

In view of the many possible embodiments to which the principles of our invention may be applied, it will be appreciated that the embodiments and aspects thereof described herein with respect to the drawings/figures are only illustrative and should not be taken as limiting the scope of the invention. For example, and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. A method, comprising:
a first network device consolidating Ethernet Alarm Indication Signal (ETH-AIS) information corresponding to a plurality of Virtual Local Area Networks (VLANs) into a single Ethernet frame;
sending, by the first network device, the Ethernet frame to a second network device over a communications link carrying traffic for the plurality of VLANs;
receiving the Ethernet frame by a second network device on a particular port of a plurality of ports of the second network device; and
sending, by the second network device, ETH-AIS information of said received consolidated ETH-AIS information corresponding to each particular VLAN of the plurality of VLANs out each port of the plurality of ports configured for sending packets for the particular VLAN except for the particular port on which said consolidated ETH-AIS information was received;
wherein said consolidating ETH-AIS information of the plurality of VLANs refers to combining individual ETH-AIS information of each of the plurality of VLANs into the single Ethernet frame sent to peer devices rather than sending separately in different Ethernet frames.

2. The method of claim 1, wherein a particular plurality of ports includes all ports of the plurality of ports, except for the particular port, configured for sending and receiving packets of at least one of the plurality of VLANs, and wherein said operation of sending includes: sending said consolidated ETH-AIS information in a single Ethernet frame out each port of the plurality of particular ports.

3. The method of claim 2, wherein said sending said consolidated ETH-AIS information in a single Ethernet frame out each port of the plurality of particular ports includes forwarding said Ethernet frame received by the second network device out each port of the plurality of particular ports.

4. The method of claim 3, wherein the Ethernet frame received by the second network device is tagged with a particular tag identifying a VLAN different than one of the plurality of VLANs; and wherein the method includes: identifying, by the second network device, the particular plurality of ports based on the particular tag.

5. The method of claim 4, programming the second network device with a supervisor VLAN corresponding to the particular VLAN, with the supervisor VLAN including the particular plurality of ports.

6. The method of claim 5, wherein the particular tag is an IEEE 802.1q tag.

7. The method of claim 6, wherein said Ethernet frame sent by the first network device includes the ETH-AIS information in an ITU-T Y.1731 Packet Data Unit (PDU) or according to IEEE 802.1ag.

8. The method of claim 4, wherein the particular tag is an IEEE 802.1q tag.

9. The method of claim 8, wherein said Ethernet frame sent by the first network device includes the ETH-AIS information in an ITU-T Y.1731 Packet Data Unit (PDU) or according to IEEE 802.1ag.

10. The method of claim 3, wherein said Ethernet frame sent by the first network device includes the ETH-AIS information in an ITU-T Y.1731 Packet Data Unit (PDU) or according to IEEE 802.1ag.

11. The method of claim 10, wherein the Ethernet frame received by the second network device is tagged with a particular tag identifying a VLAN different than one of the plurality of VLANs; and wherein the method includes: identifying, by the second network device, the particular plurality of ports based on the particular tag.

12. The method of claim 1, wherein said Ethernet frame sent by the first network device includes the ETH-AIS information in an ITU-T Y.1731 Packet Data Unit (PDU) or according to IEEE 802.1ag.

13. An apparatus, comprising:
a plurality of ports configured for communicating over a plurality of links;
one or more processors and one or more memories; wherein said one or more processors are configured to perform operations, with said operations including:
consolidating Ethernet Alarm Indication Signal (ETH-AIS) information corresponding to a plurality of Virtual Local Area Networks (VLANs) into a single Ethernet frame; and
sending the Ethernet frame from one of the plurality of ports over a communications link carrying traffic for the plurality of VLANs thereby providing the corresponding ETH-AIS information to one or more devices in each of the plurality of VLANs;
wherein said consolidating ETH-AIS information of the plurality of VLANs refers to combining individual ETH-AIS information of each of the plurality of VLANs into the single Ethernet frame sent to peer devices rather than sending separately in different Ethernet frames.

14. The apparatus of claim 13, wherein said Ethernet frame said sent by the apparatus is tagged with a particular tag identifying a VLAN different than one of the plurality of VLANs for use by a receiving network node for identifying a particular plurality of ports from which to forward said ETH-AIS information.

15. The apparatus of claim 14, wherein the particular tag is an IEEE 802.1q tag.

16. The apparatus of claim 15, wherein said Ethernet frame said sent by the apparatus includes the ETH-AIS information in an ITU-T Y.1731 Packet Data Unit (PDU) or according to IEEE 802.1ag.

17. The apparatus of claim 13, wherein said Ethernet frame said sent by the apparatus includes the ETH-AIS information in an ITU-T Y.1731 Packet Data Unit (PDU) or according to IEEE 802.1ag.

18. An apparatus, comprising:
a plurality of ports configured for communicating over a plurality of links;
one or more processors and one or more memories; wherein said one or more processors are configured to perform operations, with said operations including:
receiving, on a particular port of the plurality of ports, an Ethernet frame including consolidated Ethernet Alarm Indication Signal (ETH-AIS) information corresponding to a plurality of Virtual Local Area Networks (VLANs); and
sending ETH-AIS information of said received consolidated ETH-AIS information corresponding to each particular VLAN of the plurality of VLANs out each port of the plurality of ports configured for sending packets for the particular VLAN except for the particular port;
wherein said consolidated ETH-AIS information of the plurality of VLANs refers to combined individual ETH-AIS information of each of the plurality of VLANs into a single Ethernet frame sent to peer devices rather than sending separately in different Ethernet frames.

19. The apparatus of claim 18, wherein the Ethernet frame is tagged with a particular 802.1q tag identifying a particular VLAN different than one of the plurality of VLANs; and wherein said operation of sending ETH-AIS information of said received consolidated ETH-AIS information corresponding to each particular VLAN of the plurality of VLANs out each port of the plurality of ports configured for sending packets for the particular VLAN except for the particular port includes: identifying the particular plurality of ports from which to forward said ETH-AIS information based on the particular 802.1q tag, and forwarding said Ethernet frame received by the second network device out each port of the plurality of particular ports.

20. The apparatus of claim 18, wherein the Ethernet frame includes the ETH-AIS information in an ITU-T Y.1731 Packet Data Unit (PDU) or according to IEEE 802.1ag.

* * * * *